United States Patent [19]

Akimoto et al.

[11] 4,060,353
[45] Nov. 29, 1977

[54] ROTARY PUMP FOR HOT PITCH, ASPHALT AND LIKE VISCOUS SOLIDIFIABLE MATERIAL

[76] Inventors: Minoru Akimoto, No. 17, Kanekodaira, Azumada, Iwaki, Fukushima; Masaharu Tomizawa, No. 60-1, Sagiuchi, Nishiki, Iwaki, Fukushima, both of Japan

[21] Appl. No.: 729,258

[22] Filed: Oct. 4, 1976

[30] Foreign Application Priority Data

Oct. 2, 1975  Japan .......................... 50-133993[U]

[51] Int. Cl.² ...................... F01C 19/00; F01C 21/04; F04C 15/00; F16J 15/18
[52] U.S. Cl. ..................... 418/102; 418/104; 418/169; 277/105
[58] Field of Search ............. 418/102, 104, 166–171, 418/181, 270; 277/105

[56] References Cited

U.S. PATENT DOCUMENTS

| 860,035 | 7/1907 | Kerr | 277/105 |
|---|---|---|---|
| 1,768,818 | 7/1930 | Bock | 418/170 |
| 1,923,291 | 8/1933 | Zimmerer | 418/102 |
| 2,314,489 | 3/1943 | Fennema | 277/105 |
| 3,976,405 | 8/1976 | Geiger et al. | 418/102 |

FOREIGN PATENT DOCUMENTS 469,374  2/1952  Italy ....................... 277/105

*Primary Examiner*—John J. Vrablik
*Attorney, Agent, or Firm*—Lane, Aitken, Dunner & Ziems

[57] ABSTRACT

A rotary pump for hot pitch, asphalt and like viscous solidifiable material, having a cylindrical outer extension on a packing gland to provide an elongated passage around a driving shaft, thereby allowing leaking material to solidify and be reduced into powder before falling from the outer end of the packing gland.

3 Claims, 3 Drawing Figures

ROTARY PUMP FOR HOT PITCH, ASPHALT AND LIKE VISCOUS SOLIDIFIABLE MATERIAL

BACKGROUND OF THE INVENTION

This invention relates to rotary pumps for feeding hot pitch, asphalt and like viscous solidifiable material, and more particularly to a rotary pump having an improved packing gland whereby hot pitch or asphalt which leaks along a driving shaft is solidified and reduced into powder before falling on a floor.

Rotary pumps such as internal gear pumps are widely used to feed hot asphalt or pitch. With rotary pumps, the pumping fluid is usually allowed to leak little by little through a clearance around the circumference of a driving shaft to provide lubrication between the driving shaft and the packing which surrounds the drive shaft, thereby ensuring a prolonged life of service. For instance, the internal gear pump has two eccentric gears accommodated within a housing. one of the gears is rotated by a driving shaft which is carried in an end plate of the housing. A packing casing is also provided on the end plate around the driving shaft to encase a packing which controls the leakage of pumping fluid through the circumferencial clearance of the driving shaft. The packing is held in position in the casing by a packing gland which is fit in and securely bolted to the packing casing.

When the conventional rotary pump is used to feed hot asphalt or pitch at 300-500° C, difficulty is encountered in that the leaking pitch drips from the outer end of the packing gland onto a floor and grows into a large lump or lumps of solidified pitch, requiring additional labor for removal at certain time intervals, particularly in a continuous operation.

It is an object of the present invention to provide a rotary pump for hot asphalt, pitch and like viscous solidifiable material, which will eliminate the above-mentioned difficulty.

It is a more particular object of the present invention to provide a rotary pump for hot asphalt, pitch or like viscous solidifiable material, which is provided with grinding means for powdering the solidified material for easy removal.

It is another object of the invention to provide a rotary pump of the class mentioned above, which is provided with a cylindrical extension at the outer end of the packing gland in which the leaking material is solidified and reduced into powder before falling on a floor.

It is still another object of the invention to provide simple grinding means which can be easily adapted to conventional rotary pumps to be used for feeding hot asphalt, pitch or like viscous solidifiable material.

SUMMARY OF THE INVENTION

According to the present invention, there is provided a rotary pump for feeding hot pitch, asphalt or like viscous solidifiable material, comprising: a housing having an inlet and an outlet; an impeller accommodated in the housing and rotatable to displace a pumping fluid from said inlet to said outlet; a driving shaft carried in said housing to drive said impeller; a cylindrical packing casing provided on said housing around said driving shaft and having a flange at the outer end thereof; a packing accommodated in said casing to control leakage of said pumping fluid along said driving shaft; and a packing gland having a cylindrical body and a cylindrical outer extension on opposite sides of an annular flange; said packing gland having said cylindrical body fit inbetween said packing casing and said driving shaft to hold said packing in position in said casing and having said annular flange securely bolted to said flange at the outer end of said packing casing; said packing gland having at the inner end of said cylindrical body a short constricting section of a smaller inner diameter defining around said driving shaft a constricted clearance of half the width of the clearance defined by the remainder of said packing gland; and said outer extension of said packing gland providing a prolonged passage to allow leaking fluid to solidify and be reduced into powder before falling from the outer end of said outer extension of said packing gland.

The above and other objects, features and advantages of the invention will become clear from the following particular description of the invention and appended claims, taken in conjunction with the accompanying drawings.

DESCRIPTION OF PREFERRED EMBODIMENT

Figure 1:
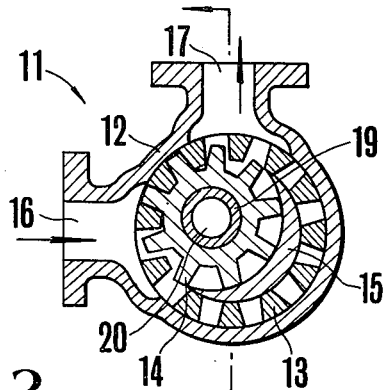
FIG. 1 is a diagrammatic sectional view of a conventional internal gear pump.
Figure 2:
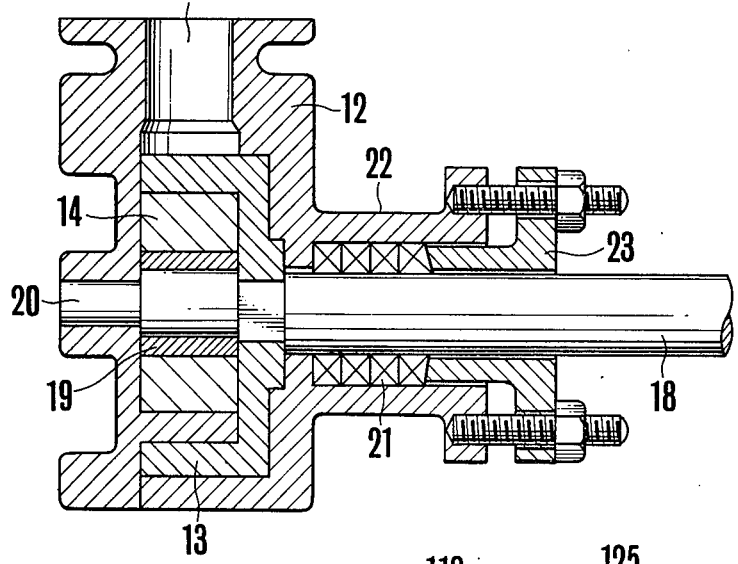
FIG. 2 is a sectional view taken on line II—II of FIG. 1.

Referring to the accompanying drawings, FIGS. 1 and 2 show the general construction of a conventional internal gear pump 11. As previously mentioned, the internal gear pump 11 has without a housing 12 an internal gear 13 and a pinion gear 14 which is mounted eccentrically relative to the internal or ring gear 13 and meshed therewith at one point on its periphery. A crescent 15 is interposed between the two gears to provide a seal between the suction and discharge sides of the pump in the usual manner. Fluid at inlet 16 trapped between the gears 13 and 14, crescent 15 and housing 12 and swept into an outlet 17. In the example illustrated in FIGS. 1 and 2, the internal gear pump 11 is driven from a driving shaft 18 which is carried in one end plate of the pump housing 12, while the pinion gear 14 is rotatably mounted through a bushing 19 on a pinion pin 20 which is in turn securely mounted on the other end plate of the pump housing 12.

The leakage of the pumping fluid along the driving shaft 18 is controlled by a packing or stuffing 21 which is accommodated within a cylindrical packing casing 22 around the driving shaft 18. The packing 21 is held in position by a packing gland 23 which is in the form of a short flanged pipe as seen in FIG. 2. The cylindrical body of the packing gland 23 is fit in the packing casing 22 with the inner end of the body abutted against the packing 21, and the flange of the packing gland 23 is securely bolted to a flange at the outer end of the packing casing 22.

As mentioned hereinbefore, the pumping fluid is purposely allowed to leak little by little through the clearance between the driving shaft 18 and packing 21 and then through the clearance between the driving shaft 18 and packing gland 23. When the pump of the above construction is used for feeding hot pitch, asphalt or like viscous solidifiable material, the result is a lump of solidified material which is formed on the floor by drips of the leaking material. In a continuous operation, the lump of the solidified material grows to a great size and becomes very difficult to remove.

Figure 3:
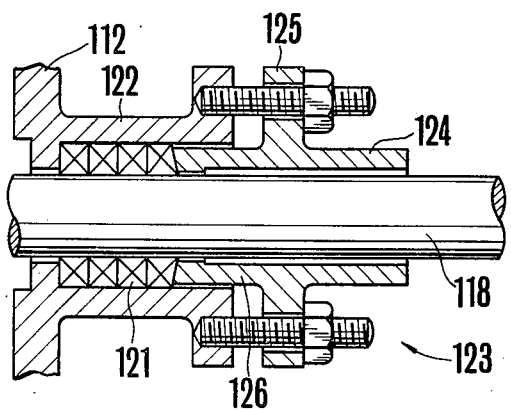
FIG. 3 is a fragmentary sectional view showing a packing gland having a cylindrical outer extension according to the present invention.

According to the present invention, this problem can be solved in a most simple and advantageous manner. FIG. 3 illustrates on an enlarged scale a packing gland and related parts of a similar internal gear pump which embodies the invention. The pump of FIG. 3 has the same construction as the conventional internal gear pump 11 of FIGS. 1 and 2 except for provision of an improved packing gland 123 which will be described hereafter. The packing gland 123 of the internal gear pump of FIG. 3 is provided with a cylindrical extension 124 extending outwardly from an annular flange 125 at the outer end of the cylindrical body 126 which is fit inbetween the driving shaft 118 and the packing casing 122.

The packing gland 123 is dimensioned to provide a clearance of about 0.5 mm around the circumference of the driving shaft 118 to a point about 10 mm from the inner end of the cylindrical body 126 which is abutted against the packing 121, while keeping a clearance of double width, say about 1 mm, along its remaining length toward the outer end of the extension 124. The cylindrical extension should have a length sufficient to allow leaking material to solidify before reaching the open outer end of the extension 124.

In operation, the pitch which leaks past the inner cylindrical body 126 is allowed to solidify while flowing through the clearance between the driving shaft 118 and the outer extension 124 and is ground into powder by the rotating action of the driving shaft 118. The solid pitch which has been reduced into powder falls on the floor from the outer open end of the extension 124 but can be removed without difficulty, for instance, with use of a shovel or other handly implements.

Asphalt contains nitrogen, sulfur and oxygen in its molecules along with heavy metals such as nickel and vanadium. In view of its corrosiveness and high viscosity, it is preferred to provide protection on the surfaces which contact hot asphalt as well as means for preventing binding due to intrusion of pitch between moving parts. For example, it is advantageous to form the pinion and ring gears from carbon steel for machine construction, e.g. carbon steel S35C. The pinion gear is preferably provided with a hardened surface protection by fusion-spraying Cr-Ni alloy added with a flux of barium and/or silicon and a self-smelting alloy matrix of high quality sintered tungsten carbide, using the method which is generally known as "metallikon".

It is advantageous to form the bushing from a nitrided steel, which has its surface nitrided in an atmosphere containing ammonia gas flows and heated to about 500°-550° C for a relatively long time period to impart increased hardness and frictional resistance to the surfaces of the bushing. For this purpose, special steel such as Cr-Al-Mo, or Cr-Mo steel-V steel will be suitable for such treatment. In addition, a more stabilized operation of the pump will be attained by providing shallow grooves on the inner periphery of the bushing.

The internal gear pump of the above construction can endure a heavy duty of pumping hot pitch or asphalt at about 490° C over one year without binding of moving parts, corrosion or other troubles.

The invention has been described thus far in connection with an internal gear pump, however, it will be understood that the invention can be applied in a similar manner to rotary pumps of other types.

What is claimed is:

1. In a rotary pump for pumping hot, viscous, solidifiable material, having a housing provided with an inlet for receiving said material and an outlet, a drive shaft extending into said housing, an impeller mounted on said drive shaft and rotatably disposed within said housing to displace said material from said inlet to said outlet, and an elongated packing casing extending about a portion of said drive shaft for sealingly holding a packing material about said drive shaft and having a first annular flange at one end thereof, the improvement comprising a packing gland disposed about said drive shaft and adjacent to said packing casing and having:

an elongated body extending about said drive shaft;

a second annular flange disposed externally on said body and defining first and second elongated portions of said body on either side of said second flange, said second flange being cooperatively attached to first flange to position said gland with said first elongated portion extending within said casing in abutment against said packing material and said second elongated portion extending away from said packing casing; and a stepped, inner passage extending along said body for receiving said drive shaft, said inner passage having a first diameter defining a constricted clearance around said drive shaft and a second diameter defining a second clearance of approximately twice as large as the constricted clearance, said constricted clearance being of a predetermined length and being provided adjacent to the end of said first elongated portion extending within said packing casing, and said second clearance extending the remaining length of said first elongated portion and the total length of said second elongated portion, said stepped, inner passage providing a clearance around said drive shaft of a length sufficient to allow viscous material leaking past said packing material to solidify and be ground to powder by rotation of said drive shaft.

2. The improvement as defined in claim 1, wherein said pump is an internal gear pump.

3. The improvement as defined in claim 1, wherein said constricted clearance has a width of 0.5 mm and a length of 10 mm extending from the end of said first elongated portion in abutment with said packing material.

* * * * *